Aug. 7, 1923.
H. D. CHURCH
1,464,466
MEANS FOR HEATING THE COMBUSTIBLE MIXTURE FOR INTERNAL COMBUSTION ENGINES
Filed Jan. 10, 1922
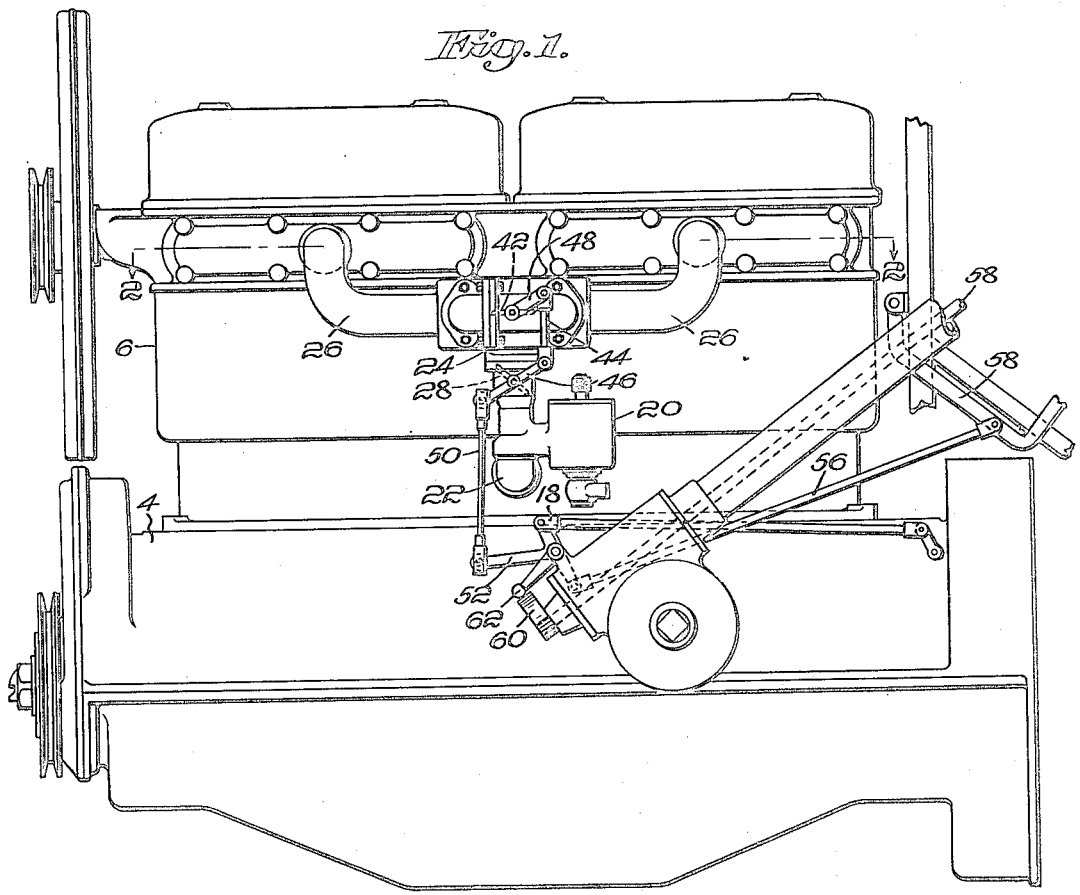
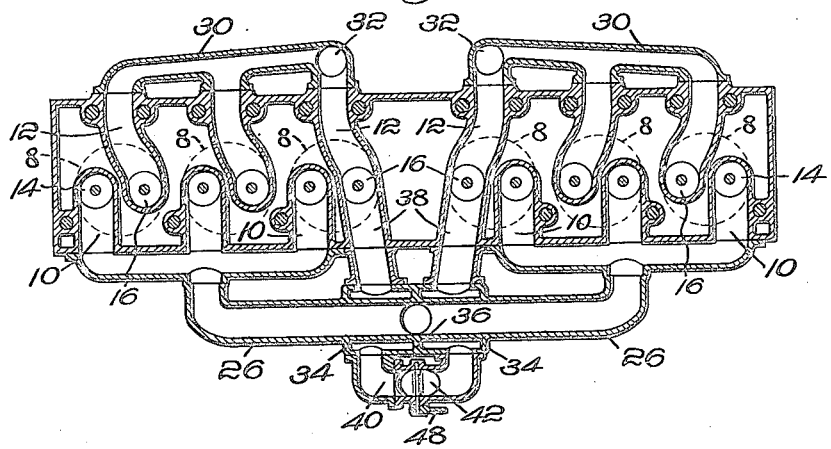
Inventor:
Harold D. Church.
By Emery, Booth, Janney & Varney.
Attys.

Patented Aug. 7, 1923.

1,464,466

UNITED STATES PATENT OFFICE.

HAROLD D. CHURCH, OF FAIRFIELD, CONNECTICUT, ASSIGNOR TO THE LOCOMOBILE COMPANY, OF BRIDGEPORT, CONNECTICUT, A CORPORATION OF DELAWARE.

MEANS FOR HEATING THE COMBUSTIBLE MIXTURE FOR INTERNAL-COMBUSTION ENGINES.

Application filed January 10, 1922. Serial No. 528,204.

*To all whom it may concern:*

Be it known that I, HAROLD D. CHURCH, a citizen of the United States, and a resident of Fairfield, county of Fairfield, and State of Connecticut, have invented an Improvement in Means for Heating the Combustible Mixture for Internal-Combustion Engines, of which the following description, in connection with the accompanying drawings, is a specification, like characters on the drawings representing like parts.

My invention aims to provide a new and improved method of and means for heating the combustible mixture supplied to an internal combustion engine. The invention will be best understood by reference to the following description, when taken in connection with the accompanying drawings of one specific embodiment thereof, while its scope will be more particularly pointed out in the appended claims.

In the drawings:

Fig. 1 is a side elevation of an internal combustion engine equipped with means for heating the combustible mixture exemplifying the invention, and Fig. 2 is a sectional view on line 2—2 of Fig. 1.

Referring to the drawings, and to the embodiment of the invention which is selected for exemplification, there is shown an internal combustion engine having a crankcase 4 presenting a base which supports a cylinder casting 6, comprising a plurality of cylinders 8 having inlet passages 10 and exhaust passages 12, controlled, respectively, by inlet valves 14 and exhaust valves 16.

Combustible mixture is supplied to the inlet passages by a carburetor 18, having a float chamber 20 for the liquid fuel, and an inlet 22 for air which, when mixed with the comminuted fuel, is converted into a combustible mixture which is delivered through a suitable intake to the inlet passages. In the present example, the intake comprises a manifold 24 having two branches 26 appropriately connected with the inlet passages. The supply of combustible mixture to the intake manifold is controlled by a usual butterfly throttle valve 28.

The cylinders, herein six in number, are arranged in two groups, each having its own exhaust manifold 30 connected to the exhaust passages 12, and each manifold having an outlet 32 leading to the atmosphere. The firing order of the cylinders, in accordance with well-known practice, is such that the ignition takes place first in a cylinder of one group of three, then in a cylinder of the other group, then in a cylinder of the first group, and so on. It follows that columns of exhaust gases are delivered alternately to the two exhaust manifolds. This fact is taken advantage of in the heating of the intake manifold in a manner now to be described.

Suitably formed on or secured to the intake manifold is a heater, herein comprising two jackets 34 encircling the branches 26, respectively, and separated from each other by a partition 36. These jackets are connected, respectively, to the exhaust manifolds by passages 38, herein forming continuations of two of the exhaust passages 12, and the jackets are connected to each other by a by-pass 40. When, therefore, the engine is running, the exhaust gases flow first in one direction and then in the other through the jackets by way of the by-pass, in order to reach the outlets of the respective exhaust manifolds. The flow of hot gases through the jackets thus heats the intake manifold at this point.

The temperature of the combustible mixture passing through the intake may be varied by variably impeding the flow through the by-pass, as by the use of a butterfly throttle valve 42. The operations of the carburetor throttle and the exhaust throttle are co-ordinated as by the provision of a link 44, which connects levers 46 and 48 secured to said valves, respectively, the arrangement being such that, when the carburetor throttle valve is closed, the exhaust throttle valve is wide open, and vice versa. When, therefore, the carburetor throttle is wide open and the exhaust manifolds are heated to a maximum, the exhaust throttle valve is closed, and the surging action of the exhaust gases through the by-pass ceases. This being so, there will naturally be a considerable volume of inert gases between the exhaust throttle valve and the nearest burning exhaust gases. These bodies of inert and comparatively cooler gases on opposite sides of the throttle valve protect the latter from flame and carbon deposit, and the valve is not subjected to undue heat, as would otherwise be the case. Obviously, the temperature of the combustible mixture passing through the intake manifold is varied in accordance with the varying engine speeds, and in a general way is inversely proportional to the amount of mixture fed to the engine.

The throttle valves may be controlled by the operator through connections of any usual or suitable nature, herein including a link 50 connecting the lever 46 to a lever 52, the latter, in turn, being swung to and fro either by a foot-operated accelerator 54 connected thereto by a link 56, or by a manually operated shaft 58, having a cam 60 cooperating with an arm 62, which is attached to the lever 52. It is usual to provide a spring connected to the accelerator pedal tending to close the throttle valve, but it is not shown herein, as it is unnecessary to a proper understanding of the present invention.

Having thus described one embodiment of the invention, but without limiting myself thereto, what I claim and desire by Letters Patent to secure is:

1. In a plural cylinder, internal combustion engine in which cylinders exhaust in alternation, the combination of an intake for the combustible mixture, two jackets about said intake, a by-pass connecting said jackets, a valve controlling said by-pass, exhaust conduits connected to said jackets, respectively, and having outlets leading to the atmosphere, and cylinders which alternately exhaust into said exhaust conduits, respectively.

2. In a plural cylinder, internal combustion engine in which cylinders exhaust in alternation, the combination of an intake for the combustible mixture, two jackets about said intake, a by-pass connecting said jackets, a valve controlling said by-pass, exhaust conduits connected to said jackets, respectively, and having outlets leading to the atmosphere, cylinders which alternately exhaust into said exhaust conduits respectively, a throttle valve controlling the admission of combustible mixture to said intake, and means connecting said valves to cause one to open and the other to open.

3. In a plural cylinder, internal combustion engine in which cylinders exhaust in alternation, the combination of an exhaust conduit presenting two outlets, cylinders which alternately exhaust into said conduit at two different points in its length intermediate said outlets, thereby producing a column of exhaust gases adapted to flow alternately in opposite directions, and means to open and close said conduit intermediate said outlets.

4. In a plural cylinder, internal combustion engine in which cylinders exhaust in alternation, the combination of an exhaust conduit presenting two outlets, cylinders which alternately exhaust into said conduit at two different points in its length intermediate said outlets, thereby producing a column of exhaust gases adapted to flow alternately in opposite directions, and means to open and close said conduit intermediate said points.

In testimony whereof, I have signed my name to this specification.

HAROLD D. CHURCH.